United States Patent
Wang et al.

(10) Patent No.: US 11,252,341 B2
(45) Date of Patent: Feb. 15, 2022

(54) METHOD AND DEVICE FOR SHOOTING IMAGE, AND STORAGE MEDIUM

(71) Applicant: Beijing Xiaomi Mobile Software Co., Ltd., Beijing (CN)

(72) Inventors: Qian Wang, Beijing (CN); Huixia Wu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 17/017,269

(22) Filed: Sep. 10, 2020

(65) Prior Publication Data

US 2021/0337137 A1   Oct. 28, 2021

(30) Foreign Application Priority Data

Apr. 27, 2020 (CN) .................. 202010346193.1

(51) Int. Cl.
  *H04N 5/232* (2006.01)
  *H04N 5/262* (2006.01)
  (Continued)

(52) U.S. Cl.
  CPC ........... *H04N 5/272* (2013.01); *G06T 5/002* (2013.01); *G06T 7/70* (2017.01); *H04N 5/23218* (2018.08);
  (Continued)

(58) Field of Classification Search
  CPC ......... H04N 5/23219; H04N 5/23232; H04N 5/262; H04N 5/2625; H04N 9/74;
  (Continued)

(56) References Cited

U.S. PATENT DOCUMENTS

| 2010/0150473 A1* | 6/2010 | Kwon ............. G06K 9/36 382/284 |
| 2011/0157427 A1 | 6/2011 | Chang |

(Continued)

FOREIGN PATENT DOCUMENTS

| CN | 103475826 A | 12/2013 |
| CN | 103916587 A | 7/2014 |

(Continued)

OTHER PUBLICATIONS

Extended European Search Report in European application No. 20197787.3, dated Mar. 1, 2021.

(Continued)

*Primary Examiner* — Marly S Camargo
(74) *Attorney, Agent, or Firm* — Finnegan, Henderson, Farabow, Garrett & Dunner, L.L.P.

(57) ABSTRACT

A method for shooting image, applied to an electronic device in which an image capturing device is mounted, includes: receiving a first input from a user; responsive to the first input, acquiring a first image and a second image captured by the image capturing device for a target object, a framing range of the first image being same as a framing range of the second image; and performing synthesis processing on the first image and the second image to generate a target image, the target image including a first object image of the target object in the first image and a second object image of the target object in the second image.

15 Claims, 12 Drawing Sheets

(51) Int. Cl.
*H04N 9/74* (2006.01)
*G06T 7/70* (2017.01)
*G06T 5/50* (2006.01)
*H04N 5/272* (2006.01)
*G06T 5/00* (2006.01)

(52) U.S. Cl.
CPC ....... *H04N 5/23229* (2013.01); *H04N 5/2621* (2013.01); *G06T 2207/20192* (2013.01)

(58) Field of Classification Search
CPC ...... H04N 1/409; H04N 1/4092; H04N 1/387; H04N 5/23218; H04N 5/23229; H04N 5/2621; H04N 5/272; G06T 7/70; G06T 7/10; G06T 7/12; G06T 7/13; G06T 5/002; G06T 5/50; G06T 3/4038; G06T 11/60; G06T 2207/20182; G06T 2207/20192
USPC .... 348/239, 222.1, 169, 170, 171, 172, 155, 348/154, 208.14, 352, 252, 597, 208.99; 382/103, 118, 199, 264, 284
See application file for complete search history.

(56) References Cited

U.S. PATENT DOCUMENTS

| | | | | |
|---|---|---|---|---|
| 2012/0002112 A1* | 1/2012 | Huang | ..................... | H04N 9/74 348/579 |
| 2012/0002897 A1 | 1/2012 | Hamada | | |
| 2012/0314104 A1 | 12/2012 | Nishiyama | | |
| 2016/0065785 A1 | 3/2016 | Tang et al. | | |
| 2018/0182145 A1* | 6/2018 | Imoto | ..................... | G06T 11/60 |
| 2020/0020086 A1* | 1/2020 | Kida | ......................... | G06T 5/50 |

FOREIGN PATENT DOCUMENTS

| | | |
|---|---|---|
| CN | 104243819 A | 12/2014 |
| CN | 105407275 A | 3/2016 |
| CN | 107231524 A | 10/2017 |
| CN | 108495045 A | 9/2018 |
| CN | 108989673 A | 12/2018 |
| CN | 109194865 A | 1/2019 |
| CN | 111010511 A | 4/2020 |
| JP | H 11-331693 A | 11/1999 |
| JP | 2003-244580 A | 8/2003 |

OTHER PUBLICATIONS

First Office Action of Chinese Application No. 202010346193.1, dated Apr. 2, 2021.
Notice of Reasons for Refusal dated Nov. 10, 2021, from the Japanese Patent Office in counterpart Japanese Application No. 2020-150271.
Notification to Grant Patent Right for Invention, dated Oct. 15, 2021, from the State Intellectual Property Office of People's Republic of China in counterpart Chinese Application No. 202010346193.1.

* cited by examiner

METHOD AND DEVICE FOR SHOOTING IMAGE, AND STORAGE MEDIUM

CROSS-REFERENCE TO RELATED APPLICATIONS

This application is based upon and claims priority to Chinese Patent Application No. 202010346193.1, filed on Apr. 27, 2020, the entire contents of which are incorporated herein by reference.

TECHNICAL FIELD

The present disclosure generally relates to the technical field of terminals, and particularly, to a method and device for shooting image, and a storage medium.

BACKGROUND

Along with the rapid development of sciences and technologies, channels for information acquisition by users have become increasingly rich. An image file, such as a picture and a video, includes a large amount of information and rich contents and is preferred by a user. Popularization of mobile terminals makes it more convenient to acquire image files. In social lives, users may propagate information through images, and personalized requirements on images also increase.

A user may want to achieve an interesting image shooting effect, for example, an effect that multiple clones of the same shooting subject at the same or different attitudes simultaneously appear in the same image. For achieving the effect of multiple clones of a subject in an image, post processing of the image is performed through image processing software in conventional art, in which the process is generally complicated, the processing effect is relatively poor, and the shooting requirement of the user may not be met.

SUMMARY

According to a first aspect of embodiments of the present disclosure, a method for shooting image, applied to an electronic device in which an image capturing device is mounted, includes: receiving a first input from a user; responsive to the first input, acquiring a first image and second image captured by the image capturing device for a target object, a framing range of the first image is same as a framing range of the second image; and performing synthesis processing on the first image and the second image to generate a target image, the target image including a first object image of the target object in the first image and a second object image of the target object in the second image.

According to a second aspect of the embodiments of the present disclosure, an electronic device in which an image capturing device is mounted, includes: a processor; and a memory configured to store instructions executable by the processor, wherein the processor is configured to receive a first input from a user; responsive to the first input, acquire a first image and a second image captured by the image capturing device for a target object, a framing range of the first image being same as a framing range of the second image; and perform synthesis processing on the first image and the second image to generate a target image, the target image including a first object image of the target object in the first image and a second object image of the target object in the second image.

According to a third aspect of the embodiments of the present disclosure, a non-transitory computer-readable storage medium has stored therein an instruction that, when executed by a processor of a mobile terminal, causes the mobile terminal to perform the method for shooting image according to the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
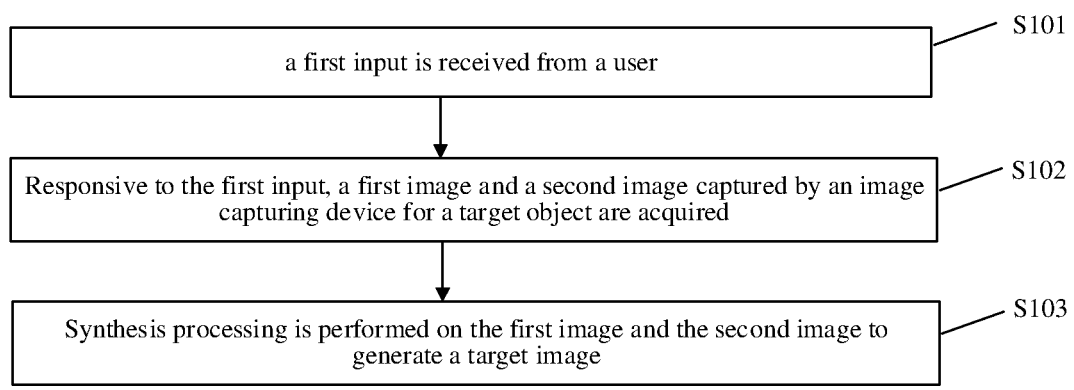
FIG. 1 is a flowchart of a method for shooting image, according to some embodiments of the present disclosure.

FIG. 1 is a flowchart of a method for shooting image, according to some embodiments of the present disclosure. For example, the method for shooting image may be applied to an electronic device in which an image capturing device is mounted. The electronic device may capture a video and/or a picture through the image capturing device. For example, the electronic device may be a smart phone, a tablet computer, a wearable device, etc., which is not limited in the embodiment of the present disclosure.

The method for shooting image in the embodiment of the present disclosure may be applied to shooting multiple shooting target objects, which may be the same objects presented in the same target image. Referring to FIG. 1, the method for shooting image includes the following steps.

In S101, a first input is received from a user.

In an embodiment, the first input includes a first sub-input and a second sub-input, the first sub-input includes an instruction for acquiring a first image, and the second sub-input includes an instruction for acquiring a second image.

In S102, responsive to the first input, a first image and a second image captured by the image capturing device for a target object are acquired.

In S103, synthesis processing is performed on the first image and the second image to generate a target image.

In an embodiment, a camera lens of the image capturing device aims at the target object to be shot, and may actively recognize the target object in a framing region through an image algorithm. The target object may be a moving object such as a pedestrian, a face, an animal and a vehicle. The image algorithm may recognize an image feature of the target object through an algorithm for recognizing an edge and contour of the object to determine that the target object is recognized. It can be understood that there may be one or more target objects. The first image and the second image may be photos and may also be videos.

It may also be determined that the target object is recognized through an operation of the user for selecting the target object, for example, clicking the target object or the region where the target object is located.

In an embodiment, the first image and the second image captured by the image capturing device for the target object are acquired; and in a capture process of the first image and the second image, a position of the terminal is kept unchanged, namely a framing range of the first image being same as a framing range of the second image. Thus, the first image and the second image are images captured for the same target object based on the same framing range.

In an embodiment, positions of a first object image and a second object image of the target object relative to the framing range may change, or attitudes and movements may also be different. The target object is located at different positions relative to the framing range by moving.

In an embodiment, the target image includes the first object image of the target object in the first image and the second object image of the target object in the second image.

In an embodiment, synthesis processing is performed on the first image and the second image to generate the target image, to obtain the target image including multiple target object images, so that a personalized shooting requirement of the user can be met.

In the above embodiments of the present disclosure, the first input is received from the user, the first image and the second image captured by the image capturing device for the target object are acquired responsive to the first input, the framing range of the first image being the same as the framing range of the second image, and synthesis processing is performed on the first image and the second image to generate the target image, the target image including the first object image of the target object in the first image and the second object image of the target object in the second image, so that the same image file including multiple object images of the target object is directly obtained by shooting, the personalized shooting requirement of the user is met, and user experience is improved.

The technical solutions provided in the embodiments of the present disclosure may have the following beneficial effects. In a shooting process, a motion of the target object is tracked to obtain the first image and the second image captured for the target object, and synthesis processing is performed on the first image and the second image to generate the target image, to obtain the target image including multiple target object images, so that a personalized shooting requirement of the user is met.

Figure 2:
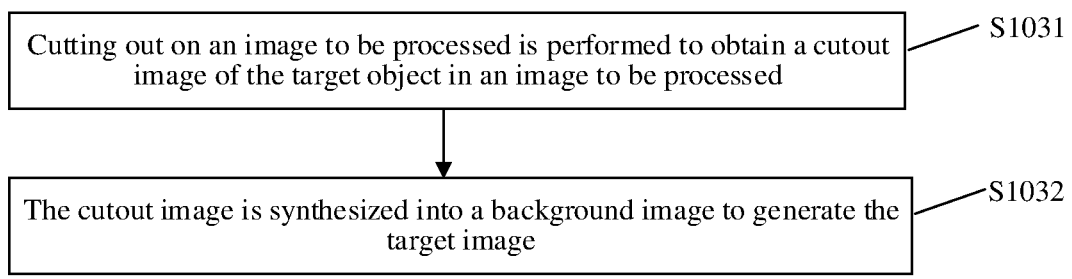
FIG. 2 is a flowchart of a method for shooting image, according to some embodiments of the present disclosure.

FIG. 2 is a flowchart of a method for shooting image, according to some embodiments of the present disclosure. As shown in FIG. 2, S103 in FIG. 1 includes the following steps.

In S1031, cutting-out on an image to be processed is performed to obtain a cutout image of the target object in the image to be processed.

In an embodiment, the image to be processed is one of the first image and the second image, and a background image is another one of the first image and the second image.

In an embodiment, the target object in the image to be processed may be recognized through the image algorithm, the contour of the target object is determined, and cutting-out on the target object is performed to obtain the cutout image of the target object. It can be understood that the image to be processed may be the first image and may also be the second image. Correspondingly, when the image to be processed is the first image, the background image is the second image; and when the image to be processed is the second image, the background image is the first image.

In S1032, the cutout image is synthesized into a background image to generate the target image.

In an embodiment, the image to be processed is the first image, cutting-out on the first object image of the target object is performed in the first image to obtain the cutout image of the target object in the first image, and the cutout image is synthesized into the second image to generate the target image.

In an embodiment, the image to be processed is the second image, cutting-out on the second object image of the target object is performed in the second image to obtain the cutout image of the target object in the second image, and the cutout image is synthesized into the first image to generate the target image. Therefore, the same image file including multiple object images of the target object may be acquired more flexibly, and changing shooting requirements of the user may be met.

Figure 3:
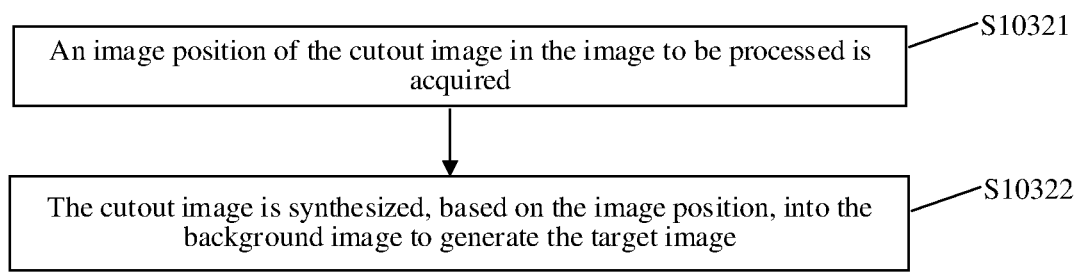
FIG. 3 is a flowchart of a method for shooting image, according to some embodiments of the present disclosure.

FIG. 3 is a flowchart of a method for shooting image, according to some embodiments of the present disclosure. As shown in FIG. 3, S1032 in FIG. 2 includes the following steps.

In S10321, an image position of the cutout image in the image to be processed is acquired.

In an embodiment, the framing range of the first image being the same as the framing range of the second image, and in the capture process of the first image and the second image, a position of the image capturing device is kept unchanged and positions of the target object in the first image and the second image change.

When cutting-out on the image to be processed is performed to obtain the cutout image of the target object in the image to be processed, the image position of the cutout image in the image to be processed is acquired. It can be understood that a position of the cutout image relative to the image to be processed is the same as a position thereof relative to the background image.

In an embodiment, the image to be processed is the first image, and an image position of the cutout image in the first image is acquired. In an embodiment, the image to be processed is the second image, and an image position of the cutout image in the second image is acquired.

In S10322, the cutout image is synthesized, based on the image position, into the background image to generate the target image.

In an embodiment, the first image is the image to be processed and the second image is the background image, and the cutout image is synthesized, based on the image position of the cutout image in the first image, into the second image to generate the target image.

In an embodiment, the first image is the background image and the second image is the image to be processed, and the cutout image is synthesized, based on the image position of the cutout image in the second image, into the first image to generate the target image.

Synthesizing the cutout image to a corresponding position in the background image according to the image position of the cutout image may ensure accurate positions of the target object images in the target image, make positions of multiple target objects in the generated target image the same as positions during capturing and meet the requirement of the user better.

Figure 4:
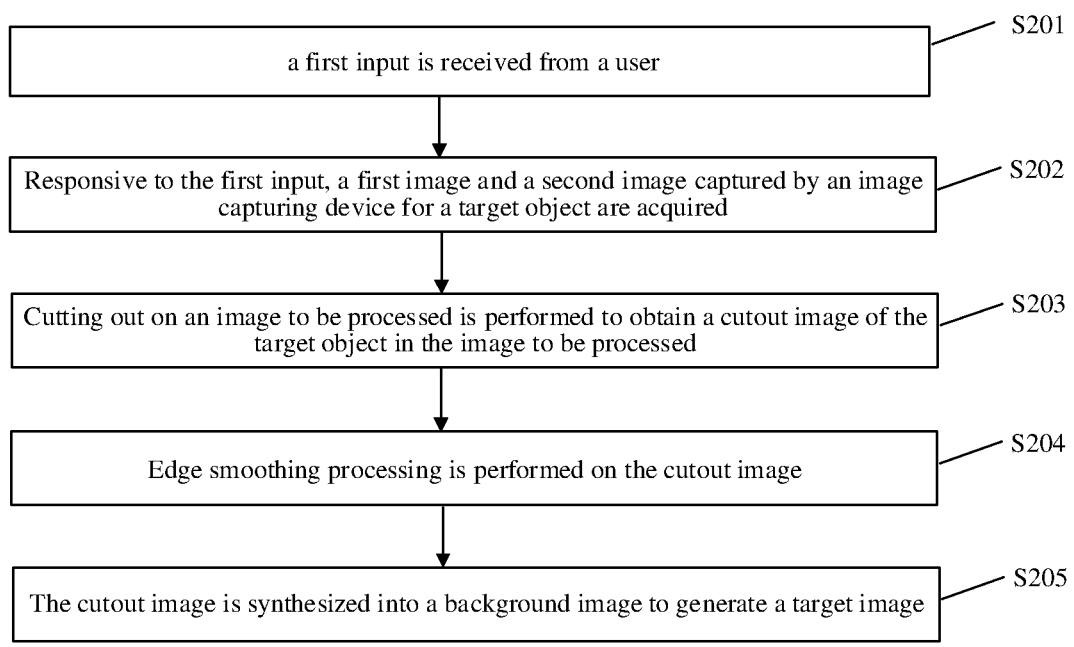
FIG. 4 is a flowchart of a method for shooting image, according to some embodiments of the present disclosure.

FIG. 4 is a flowchart of a method for shooting image, according to some embodiments of the present disclosure. As shown in FIG. 4, the method for shooting image includes the following steps.

In S201, a first input is received from a user.

In S202, responsive to the first input, a first image and a second image captured by an image capturing device for a target object are acquired.

In S203, cutting-out on an image to be processed is performed to obtain a cutout image of the target object in the image to be processed.

In S204, edge smoothing processing is performed on the cutout image.

In an embodiment, for ensuring that the cutout image is fused with a background image more naturally, edge smoothing processing is performed on the cutout image. Smoothing processing of performing pixel recognition on a boundary of the cutout image and the background image and supplementing similar pixels may be adopted to improve a synthesis effect of a target image. Smoothing processing may also be other common processing methods such as blurring transition processing in image processing technologies, which is not limited in the present disclosure.

In S205, the cutout image is synthesized into a background image to generate a target image.

In an embodiment, there are multiple second images, and second object images of the multiple second images are sequentially synthesized, according to a shooting time sequence, into the first image to generate the target image.

When it is necessary to obtain multiple target object images in the same image, namely there are multiple second images, the second object images of the multiple second images may be sequentially synthesized, according to the shooting time sequence, into the first image to generate the target image.

The multiple second images may be captured many times for the target object. In a shooting process, the first image is taken as a basis, namely taken as the first image, and the second object images of the multiple second images are sequentially synthesized, according to the shooting time sequence, into the first image to generate the target image. The target image including multiple target objects may be acquired rapidly and conveniently in real time in the shooting process, and no additional picture processing is required.

In an embodiment, the first input includes a first sub-input and a second sub-input, the first sub-input is an instruction for acquiring a first image, and the second sub-input is an instruction for acquiring a second image. The first image is acquired responsive to the first sub-input, and under the condition that the target object is recognized in a framing range of the image capturing device, and the second image is acquired responsive to the second sub-input.

The first sub-input is the instruction for acquiring the first image, and the second sub-input is the instruction for acquiring the second image. The instruction for acquiring the first image and the instruction for acquiring the second image may be instructions of the user for controlling the image capturing device for image capturing, and for example, manners of pressing down a shutter of the image capturing device, clicking a virtual button on an image capturing interaction interface and the like may be adopted.

In an embodiment, the first image is acquired responsive to the first sub-input, a feature of the target object is determined through an image algorithm, and in the shooting process, the target object is recognized in the framing range according to the feature of the target object and a motion of the target object is tracked. For example, when the target object is recognized in a framing unit after the first image is shot, an identification box may be generated at a position of the target object, the identification box following the target object in real time. The second image is acquired responsive to the second sub-input such that a user may determine the position of the target object for shooting.

For another example, after the first image is shot, under the condition that the target object is recognized in the framing range of the image capturing device, the image capturing device is set in a non-shooting state to avoid the condition that the second image does not include the same target object in the first image.

Figure 5A:
FIGS. 5A-5E are diagrams of application of a method for shooting image, according to some embodiments of the present disclosure.

FIG. 5A to FIG. 5E are diagrams of application of the above described method for shooting image, according to some embodiments of the present disclosure. In FIG. 5A, a shooting camera lens of a device for shooting image aims at the shot target object, and the target object is recognized based on the algorithm or determined by clicking of the user.

After successful recognition, a shooting identifier of the target object appears in the framing range of a shooting interface, the shutter of the terminal may be triggered for shooting, and the user may click the shutter to obtain the first image including the target object, the first image including the background image. For the recognized target object, the identification box may appear at the position of the target object to prompt the user about the position of the target object based on the background image.

It can be understood that the user may set a shooting parameter before shooting and shoot the first image after completing parameter setting.

Figure 5B:
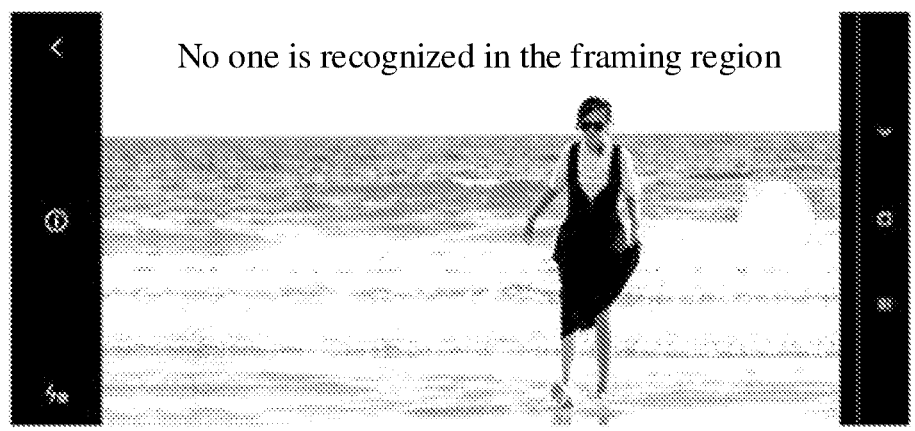

As shown in FIG. 5B, after the first image is successfully shot, the target object may move, and the user may shoot the second image as required. When the target object is not recognized in the framing range, the user is prompted, the shutter of the image capturing device is controlled to be disabled, and in such case, no image may be shot.

Figure 5C:
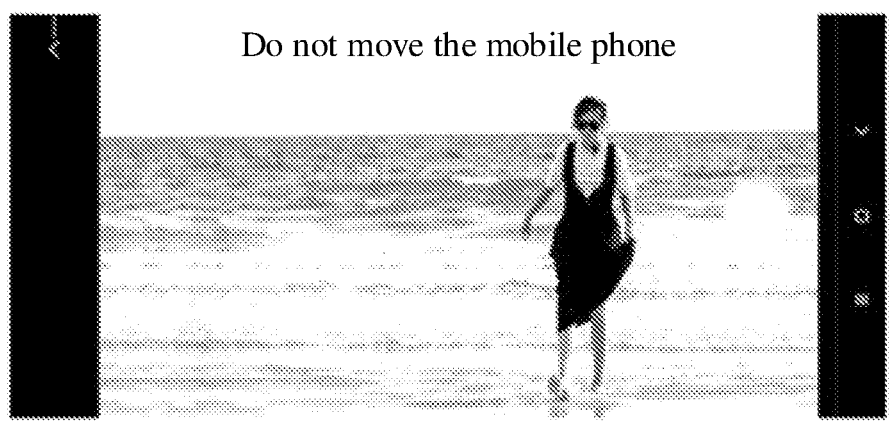

As shown in FIG. 5C, after the first image is successfully shot, the user is prompted not to move the mobile phone (the device for shooting image in this example) to determine that the framing range may not change to implement shooting of multiple object images of the same target object in the same framing range.

In an embodiment, after the first image is shot, a toolbar at the electronic device is hidden, the shooting parameter may not be set and regulated and the user is prompted to return to a shooting mode. Whether to shoot multiple target objects or not may be prompted to the user on a shooting interaction interface, and after confirmation of the user, the device returns to a shooting framing interface to perform shooting to obtain the target image.

Figure 5D:

As shown in FIG. 5D, in a shooting preview box, the target object is identified in an identification box form, and when the position of the target object does not overlap the object image of the target object, the shooting identification box is displayed, the shutter is enabled, and the user may shoot the present target object.

Figure 5E:

As shown in FIG. 5E, synthesis processing is performed on the first image and the second image to generate the target image.

The above described process may be repeatedly executed to obtain a target image including multiple target objects.

In an embodiment, the target object may be recognized in the framing range of the image capturing device through the image algorithm, and it may also be determined that the target object is recognized in the framing range of the image capturing device through an operation of the user for selecting the target object in the framing range of the image capturing device.

For example, the operation of the user for selecting the target object is clicking and framing the target object or a region where the target object is located. The image algorithm may determine the target object in the framing range through an algorithm for recognizing an edge and contour of the object. The adopted image recognition algorithm is not limited in the present disclosure. The target object is recognized for recognition, tracking and locking of the target object in the subsequent shooting process, and convenience is brought to an operation of the user for acquiring the target image including multiple target objects.

Figure 6:
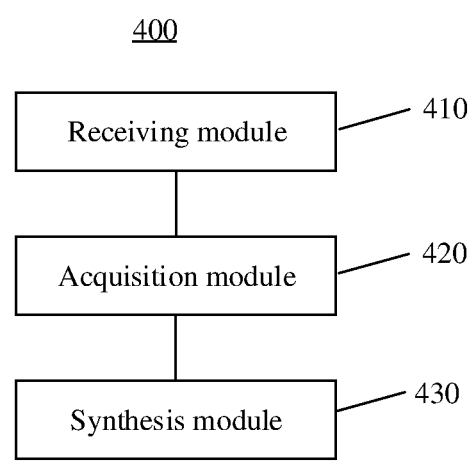
FIG. 6 is a block diagram of a device for shooting image, according to some embodiments of the present disclosure.

FIG. 6 is a block diagram of a device 400 for shooting image, according to some embodiments of the present disclosure. The device 400 for shooting image is applied to an electronic device in which an image capturing device is mounted. Referring to FIG. 6, the device 400 for shooting image includes a receiving module 410, an acquisition module 420 and a synthesis module 430.

The receiving module 410 is configured to receive a first input from a user.

The acquisition module 420 is configured to, responsive to the first input, acquire a first image and a second image captured by the image capturing device for a target object, a framing range of the first image being the same as a framing range of the second image.

The synthesis module 430 is configured to perform synthesis processing on the first image and the second image to generate a target image, the target image including a first object image of the target object in the first image and a second object image of the target object in the second image.

In an embodiment, when synthesis processing is performed on the first image and the second image to generate the target image, the synthesis module 430 is configured to perform cutting-out on an image to be processed to obtain a cutout image of the target object in the image to be processed; and synthesize the cutout image into a background image to generate the target image, the image to be processed being one of the first image and the second image and the background image being another one of the first image and the second image.

In an embodiment, when the cutout image of the target object is synthesized into the background image to generate the target image, the synthesis module 430 is configured to acquire an image position of the cutout image in the image to be processed and synthesize, based on the image position, the cutout image into the background image to generate the target image.

Figure 7:
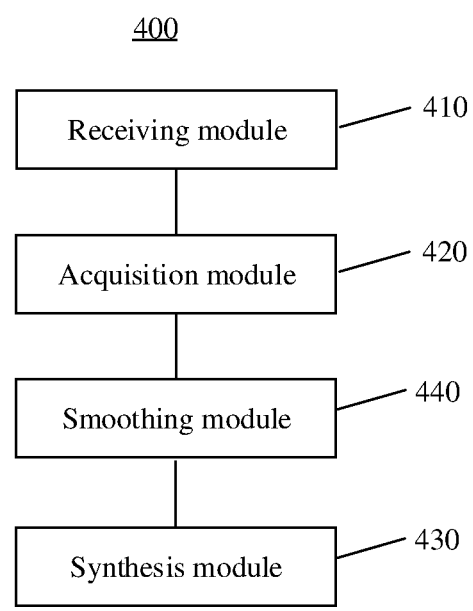
FIG. 7 is a block diagram of a device for shooting image, according to some embodiments of the present disclosure.

FIG. 7 is a block diagram of the device 400 for shooting image, according to some embodiments of the present disclosure. Referring to FIG. 7, the device 400 for shooting image 400 further includes a smoothing module 440.

The smoothing module 440 is configured to, before the cutout image is synthesized into the background image to generate the target image, perform edge smoothing processing on the cutout image.

In an embodiment, there are multiple second images, and when synthesis processing is performed on the first image and the second image to generate the target image, the synthesis module 430 is configured to sequentially synthesize, according to a shooting time sequence, second object images of the multiple second images into the first image to generate the target image.

In an embodiment, the first input includes a first sub-input and a second sub-input, the first sub-input being an instruction for acquiring the first image and the second sub-input being an instruction for acquiring the second image, and when the first image and second image captured by the image capturing device for the target object are acquired responsive to the first input, the acquisition module 420 is configured to, responsive to the first sub-input, acquire the first image, and under the condition that the target object is recognized in a framing range of the image capturing device, responsive to the second sub-input, acquire the second image.

With respect to the device in the above embodiments, the specific manners for performing operations by individual modules therein have been described in detail in the embodiments regarding the method, which will not be repeated herein.

Figure 8:
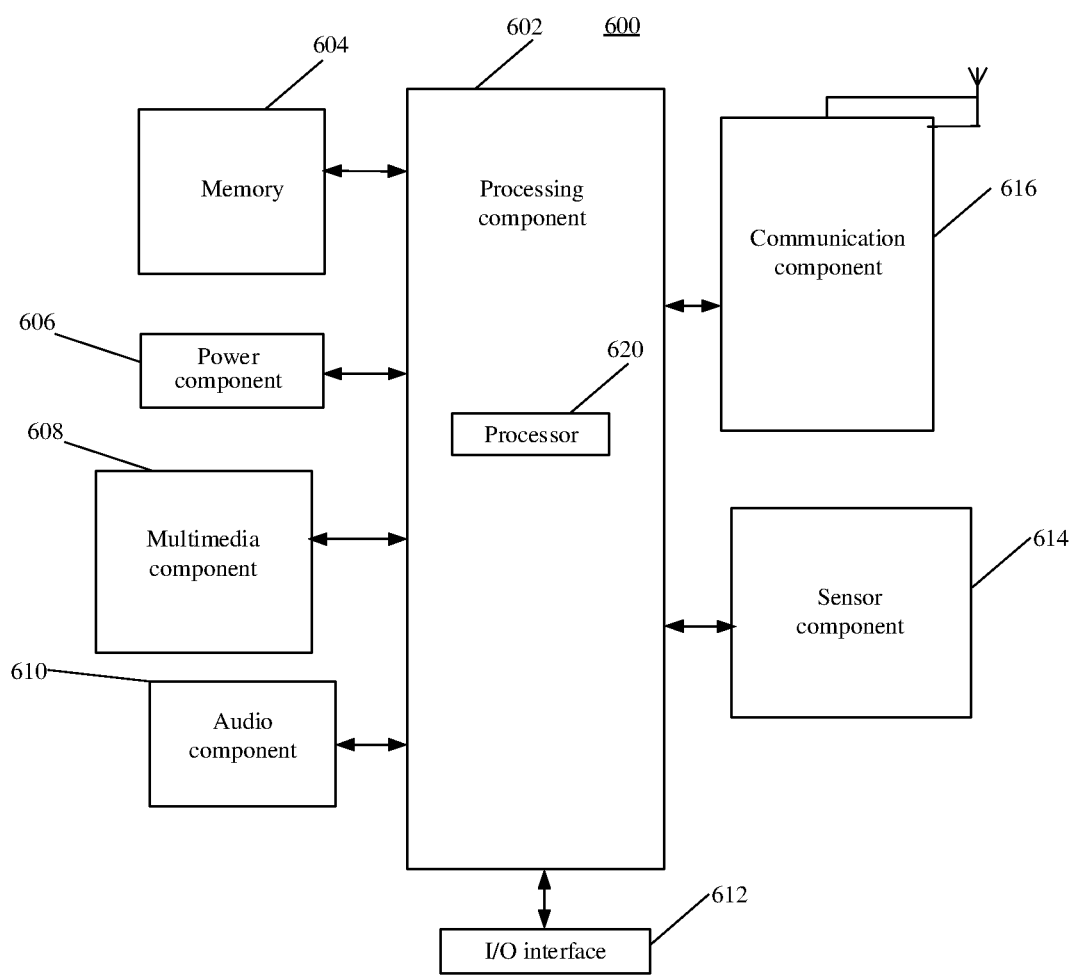
FIG. 8 is a block diagram of a device, according to some embodiments of the present disclosure.

FIG. 8 is a block diagram of a device 600 for shooting image, according to an exemplary embodiment. For example, the device 600 may be a mobile phone, a computer, a digital broadcast terminal, a messaging device, a gaming console, a tablet, a medical device, exercise equipment, a personal digital assistant and the like.

Referring to FIG. 8, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and another device. The device 600 may access a communication-standard-based wireless network, such as a Wireless Fidelity (WiFi) network, a 4th-Generation (4G) or 5th-Generation (5G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. In an exemplary embodiment, the communication component 616 may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 604 including an instruction, and the instruction may be executed by the processor 620 of the device 600 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for shooting image, applied to an electronic device in which an image capturing device is mounted, the method comprising:
   receiving a first input from a user;
   responsive to the first input, acquiring a first image and a second image captured by the image capturing device for a target object, a framing range of the first image being same as a framing range of the second image; and
   performing synthesis processing on the first image and the second image to generate a target image, the target image comprising a first object image of the target object in the first image and a second object image of the target object in the second image,
   wherein performing synthesis processing on the first image and the second image to generate the target image comprises:
   performing cutting-out on an image to be processed to obtain a cutout image of the target object in the image to be processed; and synthesizing the cutout image into a background image to generate the target image, the image to be processed being one of the first image and the second image, and the background image being another one of the first image and the second image.

2. The method of claim 1, wherein synthesizing the cutout image of the target object into the background image to generate the target image comprises:

acquiring an image position of the cutout image in the image to be processed; and synthesizing, based on the image position, the cutout image into the background image to generate the target image.

3. The method of claim 1, before synthesizing the cutout image into the background image to generate the target image, further comprising:

performing edge smoothing processing on the cutout image.

4. The method of claim 1, wherein there are multiple second images, and performing synthesis processing on the first image and the second image to generate the target image comprises:

sequentially synthesizing, according to a shooting time sequence, second object images of the multiple second images into the first image to generate the target image.

5. The method of claim 1, wherein the first input comprises a first sub-input and a second sub-input, the first sub-input being an instruction for acquiring the first image and the second sub-input being an instruction for acquiring the second image; and responsive to the first input, acquiring the first image and the second image captured by the image capturing device for the target object comprises:

responsive to the first sub-input, acquiring the first image; and under a condition that the target object is recognized in a framing range of the image capturing device, and responsive to the second sub-input, acquiring the second image.

6. An electronic device in which an image capturing device is mounted, the device comprising:

a processor; and a memory configured to store instructions executable by the processor, wherein the processor is configured to:

receive a first input from a user;

responsive to the first input, acquire a first image and a second image captured by the image capturing device for a target object, a framing range of the first image being same as a framing range of the second image; and perform synthesis processing on the first image and the second image to generate a target image, the target image comprising a first object image of the target object in the first image and a second object image of the target object in the second image, wherein in performing synthesis processing on the first image and the second image to generate the target image, the processor is further configured to:

perform cutting-out on an image to be processed to obtain a cutout image of the target object in the image to be processed; and synthesize the cutout image into a background image to generate the target image, the image to be processed being one of the first image and the second image, and the background image being another one of the first image and the second image.

7. The device of claim 6, wherein in synthesizing the cutout image of the target object into the background image to generate the target image, the processor is further configured to:

acquire an image position of the cutout image in the image to be processed; and synthesize, based on the image position, the cutout image into the background image to generate the target image.

8. The device of claim 7, wherein there are multiple second images, and in performing synthesis processing on the first image and the second image to generate the target image, the processor is further configured to:

sequentially synthesize, according to a shooting time sequence, second object images of the multiple second images into the first image to generate the target image.

9. The device of claim 6, wherein the processor is further configured to:

before the cutout image is synthesized into the background image to generate the target image, perform edge smoothing processing on the cutout image.

10. The device of claim 6, wherein the first input comprises a first sub-input and a second sub-input, the first sub-input being an instruction for acquiring the first image and the second sub-input being an instruction for acquiring the second image; and in acquiring the first image and the second image captured by the image capturing device for the target object, the processor is further configured to:

responsive to the first sub-input, acquire the first image, and under a condition that the target object is recognized in a framing range of the image capturing device, and responsive to the second sub-input, acquire the second image.

11. A non-transitory computer-readable storage medium having stored therein an instruction that, when executed by a processor of a mobile terminal, causes the mobile terminal to perform a method for shooting image, the method comprising:

receiving a first input from a user;

responsive to the first input, acquiring a first image and a second image captured by the image capturing device for a target object, a framing range of the first image being same as a framing range of the second image; and performing synthesis processing on the first image and the second image to generate a target image, the target image comprising a first object image of the target object in the first image and a second object image of the target object in the second image, wherein performing synthesis processing on the first image and the second image to generate the target image comprises:

performing cutting-out on an image to be processed to obtain a cutout image of the target object in the image to be processed; and synthesizing the cutout image into a background image to generate the target image, the image to be processed being one of the first image and the second image, and the background image being another one of the first image and the second image.

12. The non-transitory computer-readable storage medium of claim 11, wherein synthesizing the cutout image of the target object into the background image to generate the target image comprises:

acquiring an image position of the cutout image in the image to be processed; and synthesizing, based on the image position, the cutout image into the background image to generate the target image.

13. The non-transitory computer-readable storage medium of claim 11, before synthesizing the cutout image into the background image to generate the target image, the method further comprising:
- performing edge smoothing processing on the cutout image.

14. The non-transitory computer-readable storage medium of claim 11, wherein there are multiple second images, and performing synthesis processing on the first image and the second image to generate the target image comprises:
- sequentially synthesizing, according to a shooting time sequence, the second object image of the multiple second images into the first image to generate the target image.

15. The non-transitory computer-readable storage medium of claim 11, wherein the first input comprises a first sub-input and a second sub-input, the first sub-input being an instruction for acquiring the first image and the second sub-input being an instruction for acquiring the second image; and responsive to the first input, acquiring the first image and the second image captured by the image capturing device for the target object comprises:
- responsive to the first sub-input, acquiring the first image; and under a condition that the target object is recognized in a framing range of the image capturing device, and responsive to the second sub-input, acquiring the second image.

* * * * *